(No Model.) 3 Sheets—Sheet 2.

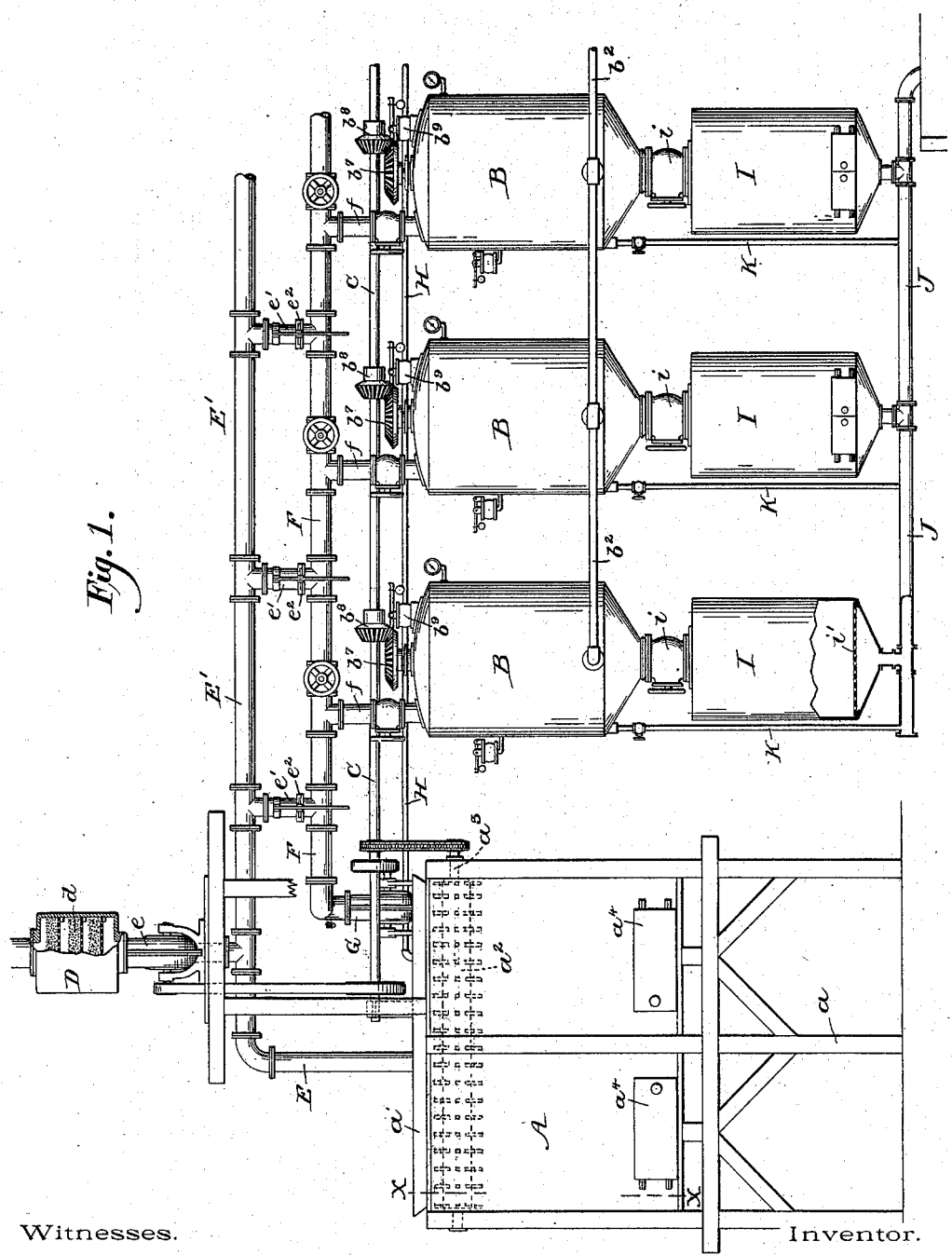

E. L. CLARK.
APPARATUS FOR TREATING GARBAGE, &c.

No. 565,669. Patented Aug. 11, 1896.

Witnesses.

Inventor.

Eady L. Clark
per John F. Nolan
Attorney.

(No Model.)  
E. L. CLARK.  
APPARATUS FOR TREATING GARBAGE, &c.
No. 565,669. Patented Aug. 11, 1896.
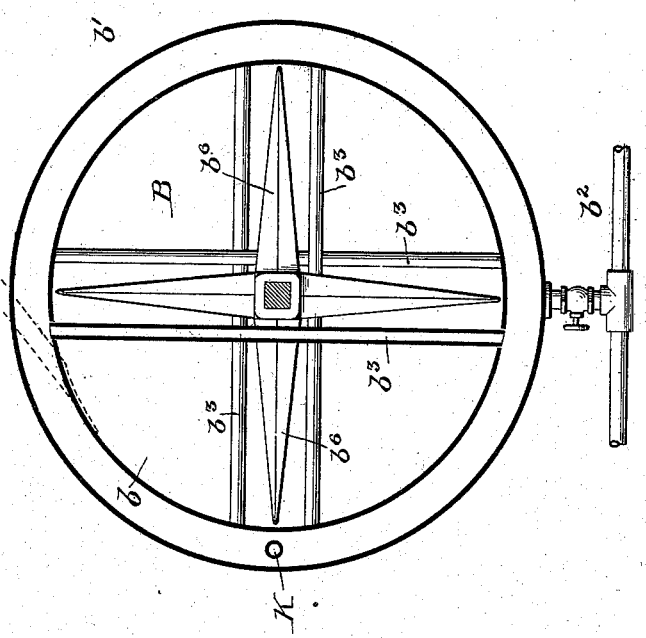
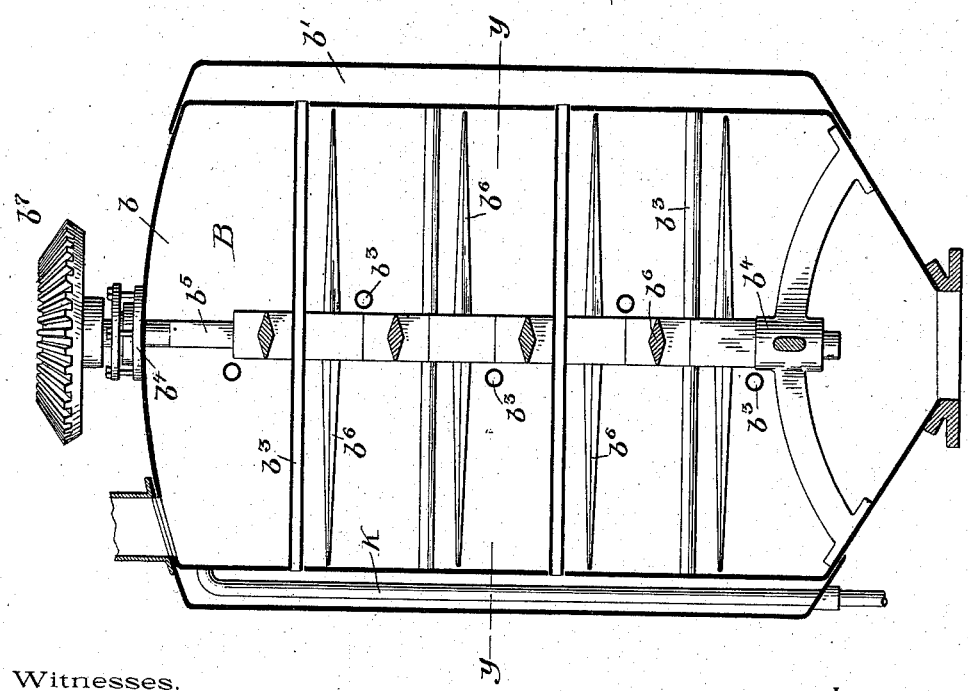
Witnesses.  
Inventor.  
Eddy L. Clark,  
per John F. Nolan,  
Attorney.

UNITED STATES PATENT OFFICE.

EDDY L. CLARK, OF PHILADELPHIA, PENNSYLVANIA.

APPARATUS FOR TREATING GARBAGE, &c.

SPECIFICATION forming part of Letters Patent No. 565,669, dated August 11, 1896.

Application filed December 15, 1894. Serial No. 531,874. (No model.)

*To all whom it may concern:*

Be it known that I, EDDY L. CLARK, a citizen of the United States, residing at the city and county of Philadelphia and State of Pennsylvania, have invented certain new and useful Improvements in Apparatus for Treating Garbage, &c., of which the following is a full, clear, and exact description, reference being had to the accompanying drawings, forming a part of this specification.

This invention relates to an apparatus for digesting and desiccating waste vegetable and animal matter to the end that the resultant product may be utilized as a merchantable commodity.

The invention, as generally stated, comprises a water-containing tank or receptacle, into which the substance is introduced, the bones and other heavy bodies gravitating to the bottom and the lighter matter floating upon the surface of the water, a steam-jacketed caldron or desiccating-chamber into which the floating substance is conveyed from the tank or receptacle, said caldron being equipped with transversely-disposed steam-pipes and with rotating knives coacting to agitate, disintegrate, and desiccate the contained substance, a chamber into which the substance thus treated is discharged, a pipe leading from the caldron to a suitable point of discharge for the purpose of conducting the oils from the substance in the caldron, and a suitably-arranged disinfecting-chamber connected with the tank and the caldron and adapted to receive and to act upon the escaping gases evolved from the substance under treatment, together with a safety-valve on the caldron and an exhaust-pipe connected with said valve and arranged to conduct the steam and other gases from the caldron to the tank should the safety-valve be blown open, in which case the noxious gases are directed to the disinfecting-chamber.

The invention also embraces novel features of construction and organization of the parts, whereby advantages are gained, as will be hereinafter described and claimed.

Figure 3:
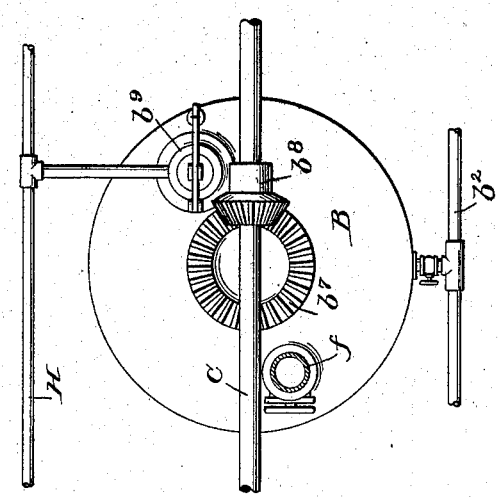
Figure 2:
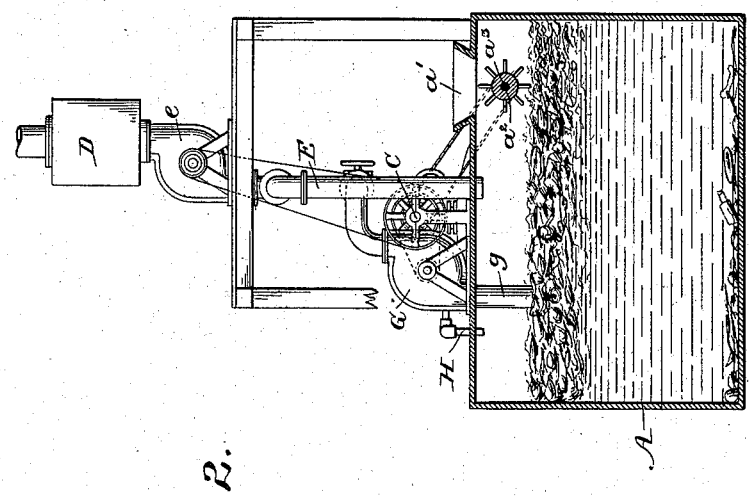

Referring to the drawings, Figure 1 is a side elevation of the apparatus, the disinfecting-chamber and one of the receiving-chambers being shown partially in section. Fig. 2 is a vertical section as on the line $x\,x$ of Fig. 1. Fig. 3 is a plan of one of the caldrons and adjuncts. Fig. 4 is a vertical section through one of the caldrons, enlarged. Fig. 5 is a transverse horizontal section as on the line $y\,y$ of Fig. 4.

A is a tank or receptacle of appropriate shape and size for its intended purpose, the same being supported upon a suitable trestle-work $a$. The top of the tank is provided with a hopper $a'$, whereby the substance may be readily introduced to the tank. At the outset this tank is partially filled with water to the end that the bones and other heavy bodies contained in the garbage will gravitate to the bottom of the tank and the lighter matter will float upon the water, whence it may be conveyed to appropriate caldrons B, hereinafter described. Arranged within the tank, just at or below the hopper, is a radially-armed wheel $a^2$, which intercepts the garbage fed to the hopper, acting upon the substance in a manner to disintegrate it and separate the hard from the softer and more liquid matter. This wheel is borne by a shaft $a^3$, which is positively driven from a main driving-shaft C, with which it is geared, as shown. The tank is provided with suitably-disposed doors $a^4$, whereby the bones, &c., may be removed.

Suitably located above the tank or elsewhere is a chamber D, in which is contained an efficient disinfectant, such, for example, as chlorid of lime. The tank communicates with this chamber by means of a pipe connection E, which is provided with an appropriate fan or air-engine $e$, constructed to induce an upward current, whereby the noxious gases arising from the garbage introduced to the tank will be drawn into the disinfecting-chamber, and therein purified before their escape to the atmosphere. If desired, such escaping gases may be directed to an adjacent furnace.

One or more caldrons are employed, as the capacity of the tank may require. When there is a series of caldrons, they are successively connected, as below explained. Each of the "caldrons," as I have termed them, is constructed as follows: $b$ is a vertically-disposed cylindrical vessel tapered at the bottom and provided with a peripheral steam-jacket $b'$, to which steam is introduced by way of a pipe $b^2$. Within the vessel are disposed, at intervals, transverse pipes $b^3$, which communicate with the opposite sides of the jacket, so that the steam will course through said pipes, and thus aid in drying the contents of the vessel. Supported in centrally-arranged bearings $b^4$ at the top and bottom of the vessel is a vertical shaft $b^5$, which is equipped with radial knives $b^6$, that are adapted to sweep around the interior of the vessel, and thus cut up and disintegrate the contained mass. These knives coact with the stationary pipes $b^3$ to reduce the substance and to expel the moisture therefrom. The upper end of the shaft extends through the head of the caldron and carries a bevel-gear $b^7$, which is engaged by a corresponding gear $b^8$ on the driving-shaft C. The several shafts in the respective caldrons are correspondingly geared with the driving-shaft.

Arranged above the caldrons is a feed-pipe F, which is connected therewith, in succession, by branch pipes $f$. This feed-pipe is connected with the discharge-nozzle of a pump G, the supply-pipe $g$ of which penetrates the tank to a point above the water-level. Hence when the pump is in action the floating substance is drawn up thereby and forced by way of the feed-pipe into the several caldrons. The feed-pipe is provided, adjacent to the respective branch pipes, with valves whereby the number of tanks supplied may be diminished or increased as occasion may require.

Immediately above the main feed-pipe is arranged a parallel pipe E', which is connected therewith, at points above the respective caldrons, by branch pipes $e'$, said latter pipes being provided with gate-valves $e^2$. The pipe E' is connected with the fan $e$ above described. When the caldrons have been charged with the substance, the operation of the pump is arrested and the gate-valves $e^2$ are opened, whereupon the liberated gases in the caldrons are drawn by the fan into and through the disinfecting-chamber. The caldrons are provided with safety-valves $b^9$, respectively, which are connected by means of a small pipe H, that leads to the interior of the tank. Should one of the valves be blown open by the pressure of the confined gases in the caldron, such gases, instead of escaping to the atmosphere, will be directed by the pipe H to the tank, thence to the disinfecting-chamber.

Directly beneath each of the caldrons is a receiver I, with which the contracted lower end of the caldron communicates by means of a valve connection $i$. This connection is closed during the treatment of the substance in the caldron, but when the substance has been effectually dried the valve is opened to permit the discharge of the substance into the receiver. This receiver comprises a cylindrical vessel provided with a perforated bottom $i'$, through which oils exuding from the substance may escape. The lower ends of the receivers communicate with a common pipe J by way of which such escaping oils are directed to an adjacent tank or receptacle.

Communicating with the interior of each of the caldrons, near the top thereof, is the upper end of a vertical pipe K, that lies within the steam-jacket, the lower end of said pipe being connected with the oil-discharge pipe, as seen in Fig. 1. The oils which float upon the top of the substance under treatment in the caldron flow into the pipe K and pass into the discharge-pipe.

The dried or partially-dried matter, either alone or in combination with other ingredients, may be used as a fertilizer, or as a food for hogs, &c. In either case it is a merchantable commodity. Besides, the bones, oils, &c., obtained may be utilized.

If desired, there may be substituted for the receivers I an endless conveyer, into which the substance may be directly discharged from the caldrons and carried thereby to a suitable receptacle.

For the purpose of introducing steam to the interior of the caldrons as a means to cleanse the latter I may provide suitable feed-pipes, as indicated at L in Fig. 5.

I claim as my invention—

1. In an apparatus for treating garbage, the combination, with a water-containing tank in which the constituents of the garbage are separated, as described, of a caldron comprising a steam-jacketed vessel with transverse steam-pipes fixed in and between the walls of said vessel so as to communicate with the jacket thereof, and a positively-driven shaft provided with arms or cutters that coact with said pipes, and means adapted to convey the contained substance from the tank to said caldron, substantially as described.

2. In an apparatus for treating garbage, &c., the combination, with a water-containing tank in which the substances of different specific gravity are separated, as described, of an adjacent caldron comprising a cylindrical steam-jacketed vessel with a positively-driven shaft therein provided with arms or cutters, a pipe extending into the upper portion of said tank and communicating with the caldron, and an interposed pump, substantially as described.

3. The combination, with a caldron comprising a steam-jacketed vessel with transverse steam-pipes rigidly fixed in and between the walls of said vessel so as to communicate with the jacket thereof, of an axial shaft in said vessel and radial arms or cutters on the shaft adapted to coact with said pipes, substantially as described.

4. The combination, with a caldron comprising a cylindrical steam-jacketed vessel, of an oil-discharge pipe arranged within the steam-jacket and extended into the interior of the vessel, substantially as described.

5. The combination, with a tank, a caldron, means for transferring the substance from the tank to the caldron, a disinfecting-chamber connected with the interior of the tank, a safety-valve on the caldron, and a pipe leading from said valve to the interior of the tank, substantially as described.

6. The combination of the tank, the caldrons, the pipes connecting said caldrons together and with the tank, the valves in said pipes, means for charging the caldrons from the tank, the disinfecting-chamber, and pipe connections between the same and the tank and the caldrons, together with the fan or air-engine and the check-valves on said latter pipe connections, substantially as described.

7. In an apparatus for treating garbage, the combination, with a water-containing tank in which the constituents of the garbage are separated as described, of a caldron comprising a steam-jacketed vessel with a positively-driven shaft therein provided with arms or cutters, means adapted to convey the contained substance from the tank to said caldron, a disinfecting-chamber, and a pipe leading thereto from the tank, substantially as described.

In testimony whereof I have hereunto affixed my signature in the presence of two subscribing witnesses.

EDDY L. CLARK.

Witnesses:
  JOHN R. NOLAN,
  A. V. GROUPE.